United States Patent [19]
Smith, Jr.

[11] Patent Number: 5,382,446
[45] Date of Patent: Jan. 17, 1995

[54] SURFACE TREATMENT PROCESS FOR LIQUID CRYSTAL CELL SUBSTRATES

[75] Inventor: Willis H. Smith, Jr., Newbury Park, Calif.

[73] Assignee: Hughes Aircraft Company, Los Angeles, Calif.

[21] Appl. No.: 64,601

[22] Filed: May 19, 1993

[51] Int. Cl.⁶ .............................................. B05D 5/12
[52] U.S. Cl. ................... 427/126.3; 427/166; 427/167; 427/255.1; 427/376.2
[58] Field of Search ............... 427/126.3, 166, 167, 427/255.1, 376.2; 428/1

[56] References Cited

U.S. PATENT DOCUMENTS

| | | | |
|---|---|---|---|
| 3,973,057 | 8/1976 | Channin et al. | 427/435 |
| 4,022,934 | 5/1977 | Miller | 427/126 |
| 4,030,997 | 6/1977 | Miller et al. | 204/192 E |
| 4,153,529 | 5/1979 | Little et al. | 204/192 EC |
| 4,464,134 | 8/1984 | Lackner et al. | 445/24 |
| 5,011,267 | 4/1991 | Miller et al. | 350/340 |
| 5,200,238 | 4/1993 | McArdle et al. | 427/240 |

OTHER PUBLICATIONS

W. P. Bleha, "Progress In Liquid Crystal Light Valves", in *Laser Focus/Electro-Optics*, pp. 111-120 (Oct. 1983).

John L. Janning, "Thin film surface orientation for liquid crystals" in *Applied Physics Letters*, vol. 21, pp. 173-174 (1972).

*Primary Examiner*—Shrive Beck
*Assistant Examiner*—Benjamin L. Utech
*Attorney, Agent, or Firm*—V. D. Duraiswamy; W. K. Denson-Low

[57] ABSTRACT

An electrically-conducting substrate coated with silicon dioxide is contacted with alcohol vapors from a source (12) by heating the substrate (16) in a microwave oven. The substrate and source of alcohol are contained in a vessel (10), on which a vacuum is optionally pulled during the heating. The process results in approximately 100 fold reduction in processing time from the prior art time of several hours to several minutes. The process may be used in either inducing perpendicular alignment or parallel alignment of liquid crystals in the cell.

13 Claims, 1 Drawing Sheet

SURFACE TREATMENT PROCESS FOR LIQUID CRYSTAL CELL SUBSTRATES

BACKGROUND OF THE INVENTION

1. Field of the Invention

The present invention relates generally to liquid crystals, and, more particularly, to a substrate that pre-aligns a liquid crystal layer.

2. Description of Related Art

One type of liquid crystal electro-optical device is constructed by placing a thin layer of liquid crystal between two transparent plates that have each been coated with a layer of an electrical conductor on its interior face. When no electric field is applied (field-OFF) between the conductive layers, the director of the liquid crystal is in one state. (The "director" of the liquid crystal is the macroscopic direction of the long molecular axis of the liquid crystal molecules.) When an electric field is applied (field-ON), the director reorients to another state. Because the liquid crystal is birefringent, the two states will have different refractive indices, and in many cases the thin layer of liquid crystal will be birefringent for light directed against the transparent plates. The state change responsive to an applied electric field is the basis for liquid crystal devices that control light, such as displays and projectors.

In its usual form, a liquid crystal light valve is a device that modulates a polarized projection light beam directed against one side of the light valve according to a writing light beam directed against the other side. The polarized projection light beam enters the light valve through one of the transparent electrodes, usually termed the counter-electrode, passes through the liquid crystal layer, and is reflected from a mirror on the other electrode. The projection light beam passes back through the liquid crystal layer and the counter-electrode, and through an external analyzer. The polarizing and analyzing functions can often be accomplished by a single polarizing beam splitter through which the projection light beam passes before and after passing through the liquid crystal. The operation of this and other types of liquid crystal light valves is discussed in greater detail in numerous technical publications; see, for example, "Progress in Liquid Crystal Light Valves", by W. P. Bleha, in Laser Focus/Electro-Optics, October 1983, pages 111-120.

In this type of liquid crystal light valve, an electric bias field is applied through the liquid crystal layer by a voltage on the conductive electrodes. The liquid crystal is oriented responsive to this electric bias field. The director of the liquid crystal is initially, in the electric field OFF state, aligned perpendicular to the plates. Application of the electric field causes the director to rotate toward the plane of the plate, changing the light transmittance of the device. The writing light pattern modulates the electric field, changing the phase retardation of the light passing through the liquid crystal, which in turn modulates the projection light beam passing through the analyzer.

For certain applications, it is desirable to orient the directors of these crystals such that they assume parallel alignment with respect to the surface of a substrate. Such an alignment is necessary for the television projection display and color symbology light valves. In general, parallel alignment is desirable if an electric field is applied across the liquid crystal normal to the surfaces, and if the liquid crystal has a positive dielectric anisotropy, so that when the molecules lie parallel to the substrate surface they can be tilted towards a perpendicular orientation.

U.S. Pat. Nos. 4,030,997, issued Jun. 21, 1977, to L. J. Miller et al and 4,022,934, issued May 10, 1977 to L. J. Miller describe methods for aligning liquid crystal molecules in the homeotropic perpendicular or tilted orientation, employing a deposited silicon dioxide which is treated by immersion in a liquid mixture of an aliphatic alcohol and an amine.

There are also methods for aligning the liquid crystal molecules parallel to the surface ("homogeneous" alignment). The simplest method is to rub the surface. Another method is to coat the surface with $SiO_2$ and etch the surface with an ion beam, as described in U.S. Pat. No. 4,153,529 by M. J. Little et al. Yet another method is oblique deposition of $SiO_2$ as reported by J. L. Janning, Applied Physics Letters, Vol. 21, pp. 173-174 (1972).

Many of the processes using a deposited $SiO_2$ layer and treating the $SiO_2$ layer with an alcohol in the vapor phase require several hours of processing time. The bulk of the processing time is primarily consumed in separate heating cycles for the alcohol source and the substrate on which the alcohol vapors are to be deposited. The reason for this process specification is the need to avoid formation of alcohol condensation droplets on the coated substrate. In the prior art, the separate heating cycles were obtained by placing the substrate in a vacuum chamber provided with a first heating means for raising the temperature of a long chain alcohol and a second heating means for raising the temperature of a liquid crystal cell to a level slightly higher than than of the alcohol. This prior art process is very time consuming, since thermal equilibrium between the alcohol vapors and the heated substrate must be reached before the reaction can take place.

There remains a need for a process which reduces the process time for treating $SiO_2$-coatings on substrates. The present invention fulfills this need, and further provides related advantages.

SUMMARY OF THE INVENTION

In accordance with the invention, an electrically-conducting substrate coated with silicon dioxide is contacted with alcohol vapors from a source by heating the substrate in a microwave oven. The process comprises the steps of:

(a) depositing a layer of silica on the substrate from a source of silica;

(b) treating the silica-coated substrate with an alcohol vapor by heating the treated substrate in a microwave oven for a time ranging from about 1 to 5 minutes; and (c) covering the treated substrate with a layer of liquid crystal.

This process of the invention results in approximately a 100-fold reduction in processing time from the prior art time of several hours to several minutes. The process may be used in either inducing perpendicular alignment or parallel alignment of liquid crystals in the cell.

BRIEF DESCRIPTION OF THE DRAWINGS

The sole Figure depicts apparatus suitably employed in the practice of the invention.

DESCRIPTION OF THE PREFERRED EMBODIMENTS

Figure 1:
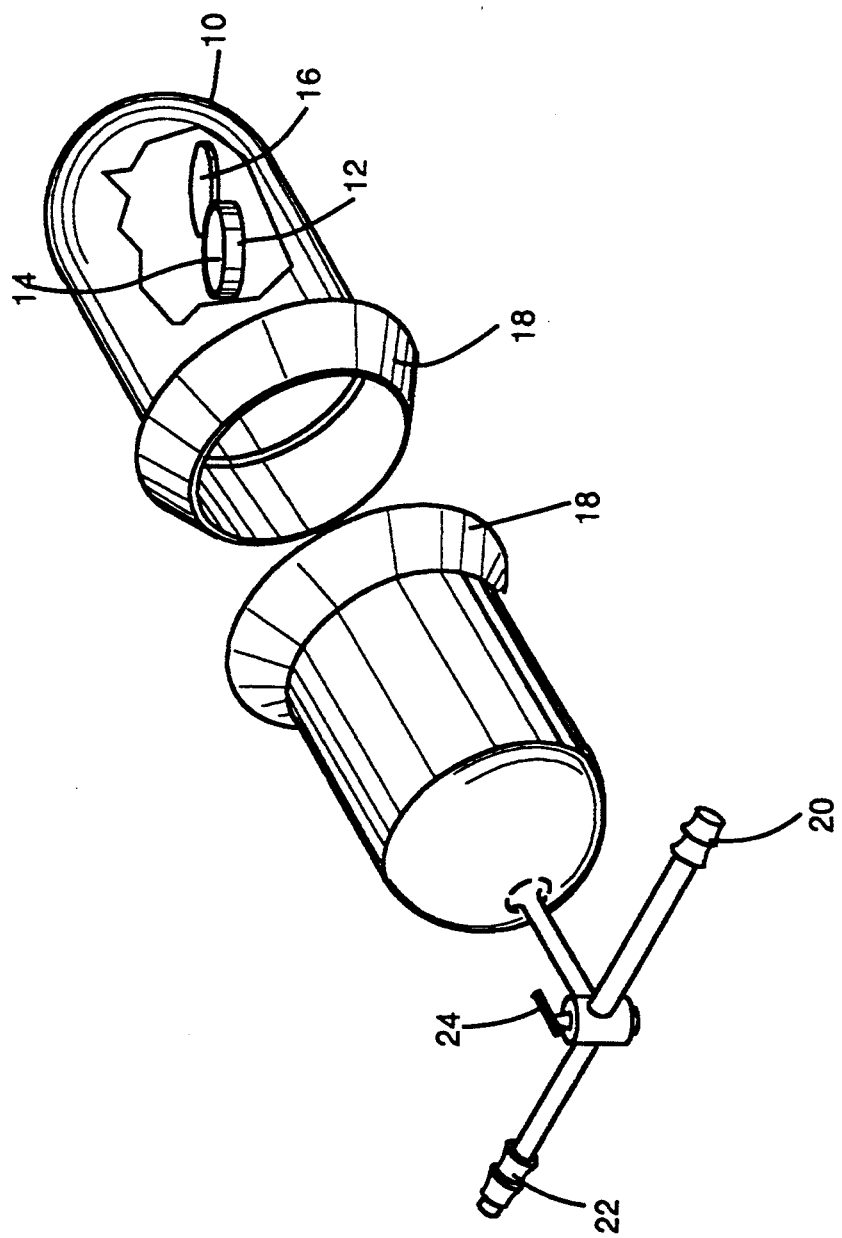

In the present invention, the silicon dioxide layer (on which the alcohol vapors are to be deposited) is heated by microwave energy applied to the underlying, electrically conductive, indium tin oxide layer. In this manner, the reaction is speeded up because the mass to be heated is reduced to a minimum. No evidence of chemical oxidation or change in specific resistance has been observed.

FIG. 1 shows the apparatus used in the practice of the invention. Here, a vessel 10 contains an alcohol vapor source crucible 12, which contains an alcohol 14, and a substrate 16 coated with silicon dioxide (not shown), overlying an electrically conductive layer (not shown), such as indium tin oxide. The vessel 10 preferably comprises a non-electrically conducting material, such as glass. The vessel 10 is adapted to be placed in a microwave oven.

The surface treatment reaction can be performed in a commercial 500 watt microwave oven in three minutes. More broadly, the time of heating in the microwave oven ranges from about 1 to 5 minutes.

While suitable results are obtained at atmospheric pressure, repeatability of results is obtained under a vacuum, specifically, at a partial pressure of about 20 to 30 millimeters of mercury. It appears that when the temperature of the alcohol is increased, alcohol vapors emanate therefrom and diffuse along the evacuated vessel.

For use with a vacuum, a ground taper joint 18 permits control of the partial pressure inside the sealed vessel 10 by means of a vacuum pump (not shown) attached at nipple 20 and a manometer (not shown) attached at nipple 22. The nipples 20 and 22 are controllably associated with the vacuum vessel 10 by means of valve 24.

Surprisingly, the electrically conductive layer underlying the silicon dioxide layer does not adversely affect the microwave action, as is commonly observed when materials to be heated in a microwave oven are contained an electrically conductive container such as metal.

Indeed, coating the inside of the alcohol vapor source crucible 12 with the electrically conductive layer (e.g., indium tin oxide) increases the heating of the alcohol and further decreases the time for vapor phase reaction with the silicon dioxide-coated substrate 16.

The foregoing is a description of a novel rapid process for preparing a directing surface which is able to align liquid crystal molecules. The replaced prior art process has a 100-fold processing time requirement, typically at least 4 hours.

The invention is suitably employed in both perpendicular and parallel alignment processes. Both processes form a silicon dioxide coating on an electrically conducting layer, such as indium tin oxide. The process employed to deposit the silicon dioxide coating is immaterial in the practice of the invention, and may comprise any of the deposition procedures, such as disclosed in U.S. Pat. Nos. 5,011,267 (deposition of sequential $SiO_2$ at medium and shallow grazing angles) and 4,030,997 (ion beam etching at a shallow angle) and in application Ser. No. 08/034,626, filed Mar. 22, 1993, pending commonly assigned (translating the substrate while sputtering $SiO_2$ thereon), for example.

Exemplary of the perpendicular alignment is U.S. Pat. No. 4,464,134, which discloses the use of long chain alcohols characterized by the formula ROH, where R is an aliphatic chain with the formula $CH_3(CH_2)_n$, where n is an integer ranging from about 9 to 23 (i.e., a carbon chain of about 10 to 24 carbon atoms).

Exemplary of the parallel alignment is application Ser. No. 08/064,565, filed May 19, 1993, pending commonly assigned, which discloses the use of aromatic alcohols, such as 2-phenylethanol, aliphatic alcohols having at least one oxygen atom in the aliphatic chain, alcohols of cyclic aliphatics, alcohols having an aromatic ring and several oxygen atoms in the chain, alcohols having an aromatic ring and sulfur atom in the chain, alcohols having branching in the aliphatic chain, alcohols having more than one alcohol group, and alcohols having heterocyclic aromatic groups.

Following treatment of the silicon dioxide coating with the alcohol vapor, the liquid crystal cell is assembled by (a) providing two spaced apart opposed coated substrates, (b) filling the space between the substrates with the desired liquid crystal, and (c) sealing the perimeter of the substrates to form the cell.

Thus, there has been disclosed a surface treatment process for liquid crystal cell substrates, employing microwave heating. It will be readily apparent to those skilled in this art that various changes and modifications may be made without departing from the spirit of the invention, and all such changes and modifications are considered to fall within the scope of the invention, as defined by the appended claims.

What is claimed is:

1. A process for preparing a treated substrate to produce alignment of a liquid crystal on a surface of said substrate, said surface provided with an electrically conducting layer, comprising the steps of:
    (a) depositing a layer of silica on said substrate from a source of silica;
    (b) treating the silica-coated substrate with an alcohol vapor by
        (1) placing said silica-coated substrate in an enclosed, non-electrically conducting vessel, together with a source for generating said alcohol vapor, said source consisting essentially of an alcohol,
        (2) placing said enclosed vessel in a microwave oven, and
        (3) energizing said microwave oven so as to heat at least said substrate in said microwave oven for a time ranging from about 1 to 5 minutes to thereby treat said silica-coated substrate with said alcohol vapor; and
    (c) covering said treated substrate with a layer of liquid crystal.

2. The process of claim 1 wherein said treating in step (b) is done at a partial pressure within said vessel ranging from about 20 to 30 millimeters of mercury.

3. The process of claim 1 wherein said microwave oven is energized to a power of 500 watts.

4. The process of claim 1 wherein said heating is performed for a time of about three minutes.

5. The process of claim 1 wherein said alignment is perpendicular and said alcohol comprises an aliphatic alcohol having the formula ROH, where R is an aliphatic chain with the formula $CH_3(CH_2)_n$, where n is an integer ranging from about 9 to 23.

6. The process of claim 1 wherein said alignment is parallel and said alcohol is selected from the group consisting of aromatic alcohols, aliphatic alcohols having at least one oxygen atom in the aliphatic chain, cyclic aliphatic alcohols, alcohols having an aromatic ring and several oxygen atoms in the chain, alcohols having an aromatic ring and sulfur atom in the chain, alcohols having branching in the aliphatic chain, alcohols having more than one alcohol group, and alcohols having heterocyclic aromatic groups.

7. The process of claim 1 wherein said electrically conducting layer comprises indium tin oxide.

8. A process for preparing a treated substrate to produce alignment of a liquid crystal on a surface of said substrate, said surface provided with an electrically conducting layer, comprising the steps of:
(a) depositing a layer of silica on said substrate from a source of silica;
(b) treating the silica-coated substrate with an alcohol vapor by
  (1) placing said silica-coated substrate in a enclosed, non-electrically conducting vessel, together with a source for generating said alcohol vapor, said source consisting essentially of an alcohol,
  (2) placing said enclosed vessel in a microwave oven, and
  (3) energizing said microwave oven so as to heat at least said substrate in said microwave oven for a time ranging from about 1 to 5 minutes and at a partial pressure within said vessel ranging from about 20 to 30 millimeters of mercury to thereby treat said silica-coated substrate with said alcohol vapor; and
(c) covering said treated substrate with a layer of liquid crystal.

9. The process of claim 8 wherein said microwave oven is energized to a power of 500 watts.

10. The process of claim 8 wherein said heating is performed for a time of about three minutes.

11. The process of claim 8 wherein said alignment is perpendicular and said alcohol comprises an aliphatic alcohol having the formula ROH, where R is an aliphatic chain with the formula $CH_3(CH_2)_n$, where n is an integer ranging from about 9 to 23.

12. The process of claim 8 wherein said alignment is parallel and said alcohol is selected from the group consisting of aromatic alcohols, aliphatic alcohols having at least one oxygen atom in the aliphatic chain cyclic aliphatic alcohols, alcohols having an aromatic ring and several oxygen atoms in the chain, alcohols having an aromatic ring and sulfur atom in the chain, alcohols having branching in the aliphatic chain, alcohols having more than one alcohol group, and alcohols having heterocyclic aromatic groups.

13. The process of claim 8 wherein said electrically conducting layer comprises indium tin oxide.

* * * * *